United States Patent
Lindahl

(10) Patent No.: US 10,674,303 B2
(45) Date of Patent: Jun. 2, 2020

(54) SYSTEM AND METHOD FOR MAINTAINING ACCURACY OF VOICE RECOGNITION

(71) Applicant: Apple Inc., Cupertino, CA (US)

(72) Inventor: Aram M. Lindahl, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/144,851

(22) Filed: Sep. 27, 2018

(65) Prior Publication Data

US 2019/0124462 A1 Apr. 25, 2019

Related U.S. Application Data

(60) Provisional application No. 62/566,249, filed on Sep. 29, 2017.

(51) Int. Cl.
| | |
|---|---|
| *H04R 3/02* | (2006.01) |
| *H04R 27/00* | (2006.01) |
| *G06F 3/16* | (2006.01) |
| *H04R 3/00* | (2006.01) |
| *H04S 7/00* | (2006.01) |
| *H04R 7/00* | (2006.01) |

(52) U.S. Cl.
CPC .............. *H04S 7/301* (2013.01); *G06F 3/165* (2013.01); *H04R 3/005* (2013.01); *H04R 3/02* (2013.01); *H04R 27/00* (2013.01); *H04R 2227/009* (2013.01); *H04R 2410/05* (2013.01); *H04R 2430/01* (2013.01)

(58) Field of Classification Search
CPC ... G06F 3/165; G06F 3/167; H04R 2227/009; H04R 2410/05; H04R 2430/01; H04R 27/00; H04R 3/005; H04R 3/02; H04S 7/301
USPC ................... 381/18, 57, 73.1, 300, 303, 307
See application file for complete search history.

(56) References Cited

U.S. PATENT DOCUMENTS

| | | | |
|---|---|---|---|
| 8,428,758 B2 | 4/2013 | Naik et al. | |
| 9,462,115 B2 | 10/2016 | Rand | |
| 10,019,981 B1 | 7/2018 | Porter et al. | |
| 2013/0259254 A1* | 10/2013 | Xiang | ................. G10K 11/175 381/73.1 |
| 2014/0222436 A1 | 8/2014 | Binder et al. | |
| 2015/0131966 A1 | 5/2015 | Zurek et al. | |
| 2015/0223002 A1* | 8/2015 | Mehta | ...................... H04S 7/30 381/303 |

(Continued)

OTHER PUBLICATIONS

Pending U.S. Appl. No. 15/967,089, filed Apr. 30, 2018. 42 pages.

*Primary Examiner* — Vivian C Chin
*Assistant Examiner* — Friedrich Fahnert
(74) *Attorney, Agent, or Firm* — Womble Bond Dickinson (US) LLP

(57) ABSTRACT

Method and system for maintaining accuracy of voice recognition are described herein. The audio system reproducing sound using a loudspeaker array that is housed in a loudspeaker cabinet may selection from a number of sound rendering modes and changing the selected sound rendering mode based on the current playback volume set on the audio system. The sound rendering modes include at least one of: a number of free space modes and a number of complex modes. Other aspects are also described and claimed.

17 Claims, 6 Drawing Sheets

(56) References Cited

U.S. PATENT DOCUMENTS

| | | | |
|---|---|---|---|
| 2015/0350804 A1* | 12/2015 | Crockett | H04R 5/02 |
| | | | 381/307 |
| 2016/0295340 A1 | 10/2016 | Baker et al. | |
| 2017/0075563 A1 | 3/2017 | Bauer et al. | |
| 2017/0223447 A1 | 8/2017 | Johnson et al. | |
| 2018/0098171 A1 | 4/2018 | Family et al. | |
| 2018/0352334 A1* | 12/2018 | Family | H04R 1/403 |
| 2019/0028079 A1* | 1/2019 | Goldstein | H03G 3/342 |
| 2019/0074025 A1* | 3/2019 | Lashkari | H04R 3/02 |

* cited by examiner

SYSTEM AND METHOD FOR MAINTAINING ACCURACY OF VOICE RECOGNITION

CROSS-REFERENCED RELATED APPLICATIONS

This application claims the benefit pursuant to 35 U.S.C. 119(e) of U.S. Provisional Application No. 62/566,249, filed Sep. 29, 2017, which application is specifically incorporated herein, in its entirety, by reference.

FIELD

An aspect of the disclosure relates to systems and methods for maintaining accuracy of voice recognition.

BACKGROUND

Much effort has been spent on developing techniques that are intended to reproduce a sound recording with improved quality, so that it sounds as natural as in the original recording environment. The approach is to create around the listener a sound field whose spatial distribution more closely approximates that of the original recording environment.

Loudspeaker arrays such as line arrays have been used for large venues such as outdoors music festivals as well as closed large spaces such as sports arenas and malls, to produce spatially selective sound (beams) that are directed at the audience.

While the systems are improving the quality of the reproduction of a sound recording, these systems may experience degradation in the accuracy of voice recognition based on the volume or type of the audio being played back.

SUMMARY

The accuracy of the voice recognition (e.g., the voice trigger accuracy) in an audio system with internal speakers and microphones is dependent on the listening levels of the audio being played back. For example, voice trigger accuracy is very high when the audio system provides no audio playback. However, as the audio playback (e.g., music) from the internal speakers begins to dominate the user's voice commands to be received by the internal microphones of the audio system, the voice trigger accuracy decreases.

The voice trigger accuracy also depends on how the internal speakers in the audio system are energized. For example, different sound rendering modes (e.g., playback patterns such as omnidirectional, cardiod, complex, etc.) lead to different levels of echo on the internal microphones which increases or decreases the speech to echo ratios at the microphones and thus, affecting the voice trigger accuracy.

An aspect of the disclosure aims to manage the tradeoffs between rendering audio with clarity and immersion or a sense of space (e.g., a broad and spacious playback), within a room or other confined space, using a loudspeaker array, and maintaining high voice recognition accuracy. The disclosure could have many applications, such as and not limited to a home audio system, any consumer electronics device with audio capability, and an audio system in a vehicle (e.g., an automobile infotainment system).

In one aspect, a system for maintaining accuracy of voice recognition has a loudspeaker cabinet in which are integrated a number of drivers, and a number of audio amplifiers are coupled to the inputs of the drivers. The system includes a plurality of microphones to receive acoustic signals that may include a speaker's speech. A rendering processor receives a number of input audio channels (e.g., left and right of a stereo recording) of a piece of sound program content such as a musical work or an audio-visual work, that is to be converted into sound by the drivers. The rendering processor has outputs that are coupled to the inputs of the amplifiers over a digital audio communication link. The rendering processor also has a number of sound rendering modes of operation in which it produces individual signals for the inputs of the drivers. A decision logic (a decision processor) is to determine a current playback volume set on the audio system for playback the piece of sound program content, and to select one of a plurality of sound rendering modes based on the current playback volume, and to change the selected sound rendering mode based on changes to the current playback volume. In one aspect, the decision logic is to further select the one of the plurality of sound rendering modes based whether the audio system is located within a predetermined distance from an acoustically reflective surface. In one aspect, the decision logic further to determine a dynamic measurement of content energy of the piece of sound program content that is to be converted into sound by the loudspeaker array, and to change the selected sound rendering mode based on the dynamic measurement of content energy of the piece of sound program content. In one aspect, the decision logic further to determine a residual echo in acoustic signals received by at least one of the microphones based on the sound being played back by the loudspeaker array, and to change the selected sound rendering mode based on the residual echo. In another aspect, the decision logic is to detect a location of a speaker using at least one of a visual sensor or an audio sensor and to signal to the microphones to generate a speech beamformer in a direction of the location of the speaker to capture the speaker's speech.

In these aspects, the decision logic is to make a rendering mode selection for the rendering processor, in accordance with which the loudspeakers are driven during playback of the piece of sound program content. The rendering mode selection may be changed, for example automatically during the playback, based on changes in the decision logic inputs.

In one aspect, a method for maintaining accuracy of voice recognition on an audio system starts by receiving a plurality of input audio channels of a piece of sound program content that is to be converted into sound by a loudspeaker array housed in a loudspeaker cabinet. The audio system includes the loudspeaker array, which includes a plurality of loudspeaker drivers. A current playback volume set on the audio system for playback the piece of sound program content is then determined. One of a plurality of sound rendering modes may then be selected based on the current playback volume. The selected sound rendering mode may also be changed based on changes the current playback volume. In one aspect, the sound rendering modes include a) a plurality of free space modes and/or b) a plurality of complex modes. In each of the plurality of free space modes, the loudspeaker array produces sound beams having i) an omni-directional pattern that includes a sum of two or more of the plurality of input audio channels, superimposed with ii) a directional pattern that has a plurality of lobes each lobe containing a difference of the two or more input audio channels. In one aspect, the plurality of free space modes includes at least a low volume free space mode, a medium volume free space mode, and a high volume free space mode. In the low volume free space mode, the loudspeaker array produces audio that is played consistently around the audio system, and in the higher volume free space mode, the loudspeaker array produces a focused sound beam that is aimed at the listening position. In one aspect, to produce the focused sound beam, the loudspeaker drivers positioned away from the listening position emit lower energy than the loudspeaker drivers positioned towards the listening position. In one aspect, in the plurality of complex modes, the loudspeaker array produces i) a sound beam having a direct content pattern that is aimed at the listening position, superimposed with ii) at least one sound beam having an ambient content pattern that is aimed away from the listening position. The plurality of complex modes may include at least a low volume complex mode, a medium volume complex mode, and a high volume complex mode. In one aspect, the at least one sound beam having the ambient content pattern in the low volume complex mode emits higher energy than the at least one sound beam having the ambient content pattern in the high volume complex mode.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects of the disclosure are illustrated by way of example and not by way of limitation in the figures of the accompanying drawings in which like references indicate similar elements. It should be noted that references to "an" or "one" aspect of the disclosure in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described in the aspects are not explicitly defined, the scope of the disclosure is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

A stereophonic recording captures a sound environment by simultaneously recording from at least two microphones that have been strategically placed relative to the sound sources. During playback of these (at least two) input audio channels through respective loudspeakers, the listener is able to (using perceived, small differences in timing and sound level) derive roughly the positions of the sound sources, thereby enjoying a sense of space. In one approach, a microphone arrangement may be selected that produces two signals, namely a mid signal that contains the central information, and a side signal that starts at essentially zero for a centrally located sound source and then increases with angular deviation (thus picking up the "side" information.) Playback of such mid and side signals may be through respective loudspeaker cabinets that are adjoining and oriented perpendicular to each other, and these could have sufficient directivity to in essence duplicate the pickup by the microphone arrangement.

Figure 1:
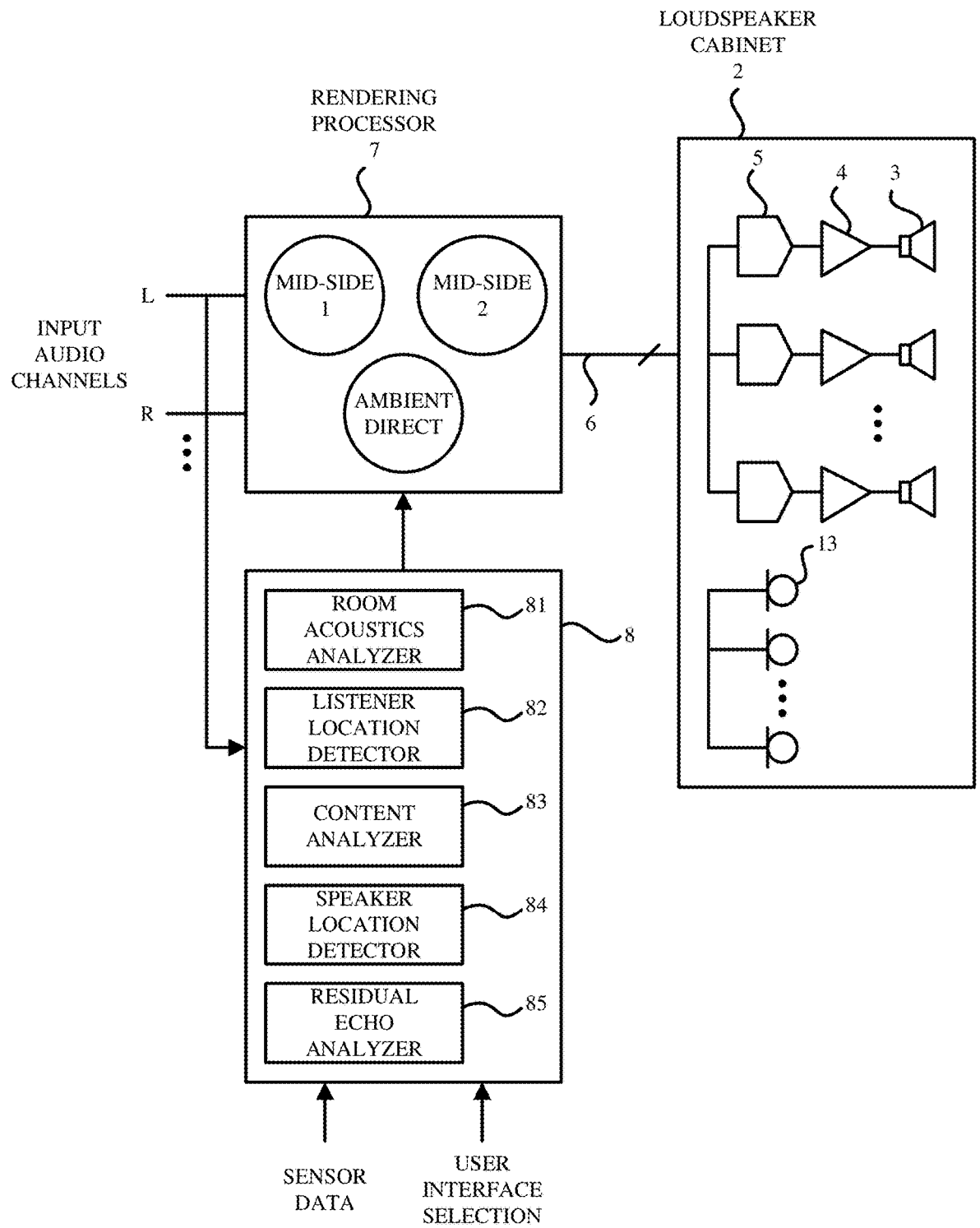
FIG. 1 is a block diagram of an audio system having a beamforming loudspeaker array for maintaining accuracy of voice recognition in one aspect of the disclosure.
Figure 2:
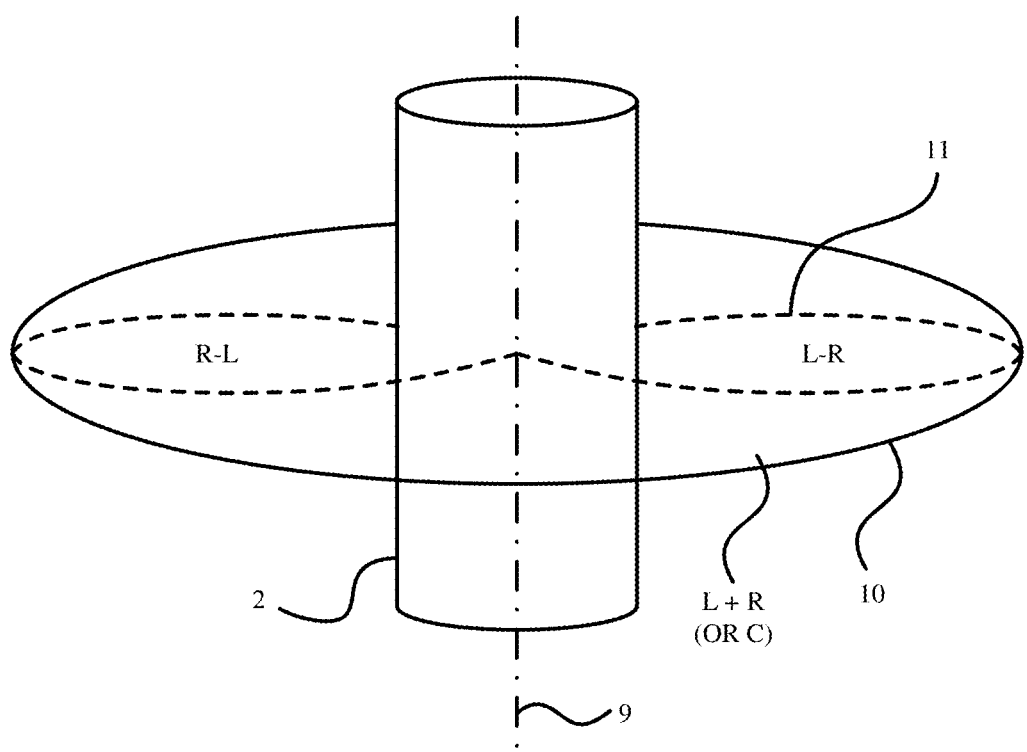
FIG. 2 is an elevation view of sound beams produced in a one of the plurality of free-space mode in one aspect of the disclosure.

FIG. 1 is a block diagram of an audio system having a beamforming loudspeaker array for maintaining accuracy of voice recognition in one aspect of the disclosure. The beamforming loudspeaker array is being used for playback of a piece of sound program content that is within a number of input audio channels. A loudspeaker cabinet 2 (also referred to as an enclosure) has integrated therein a number of loudspeaker drivers 3 (numbering at least 3 or more and, in most instances, being more numerous than the number of input audio channels). In one aspect, the cabinet 2 may have a generally cylindrical shape, for example, as depicted in FIG. 2 and also as seen in the top view in FIG. 6, where the drivers 3 are arranged side by side and circumferentially around a center vertical axis 9. Other arrangements for the drivers 3 are possible. In addition, the cabinet 2 may have other general shapes, such as a generally spherical or ellipsoid shape in which the drivers 3 may be distributed evenly around essentially the entire surface of the sphere. The drivers 3 may be electrodynamic drivers, and may include some that are specially designed for different frequency bands including any suitable combination of tweeters and midrange drivers, for example.

The loudspeaker cabinet 2 in this example also includes a number of power audio amplifiers 4 each of which has an output coupled to the drive signal input of a respective loudspeaker driver 3. Each amplifier 4 receives an analog input from a respective digital to analog converter (DAC) 5, where the latter receives its input digital audio signal through an audio communication link 6. Although the DAC 5 and the amplifier 4 are shown as separate blocks, in one aspect the electronic circuit components for these may be combined, not just for each driver but also for multiple drivers, in order to provide for a more efficient digital to analog conversion and amplification operation of the individual driver signals, e.g., using for example class D amplifier technologies.

As shown in FIG. 1, the loudspeaker cabinet 2 may also include a plurality of microphones 13 to receive a speaker's speech. The microphones 13 may be air interface sound pickup devices that convert sound into an electrical signal. The microphones 13 may be used to create microphone array beams (i.e., beamformers), which can be steered to a given direction by emphasizing and deemphasizing selected microphones.

The individual digital audio signal for each of the drivers 3 is delivered through an audio communication link 6, from a rendering processor 7. The rendering processor 7 may be implemented within a separate enclosure from the loudspeaker cabinet 2 (for example, as part of a computing device 18—see FIG. 6—which may be a smartphone, laptop computer, or desktop computer). In those instances, the audio communication link 6 is more likely to be a wireless digital communications link, such as a BLUETOOTH link or a wireless local area network link. In other instances however, the audio communication link 6 may be over a physical cable, such as a digital optical audio cable (e.g., a TOSLINK connection), or a high-definition multi-media interface (HDMI) cable. In another aspect, the rendering processor 7 and the decision logic 8 are both implemented within the outer housing of the loudspeaker cabinet 2.

The rendering processor 7 is to receive a number of input audio channels of a piece of sound program content, depicted in the example of FIG. 1 as only a two channel input, namely left (L) and right (R) channels of a stereophonic recording. For example, the left and right input audio channels may be those of a musical work that has been recorded as only two channels. Alternatively, there may be more than two input audio channels, such as for example the entire audio soundtrack in 5.1-surround format of a motion picture film or movie intended for large public theater settings. These are to be converted into sound by the drivers 3, after the rendering processor transforms those input channels into the individual input drive signals to the drivers 3, in any one of several sound rendering modes of operation. The rendering processor 7 may be implemented as a programmed digital microprocessor entirely, or as a combination of a programmed processor and dedicated hard-wired digital circuits such as digital filter blocks and state machines. The rendering processor 7 may contain a beamformer that can be configured to produce the individual drive signals for the drivers 3 so as to "render" the audio content of the input audio channels as multiple, simultaneous, desired beams emitted by the drivers 3, as a beamforming loudspeaker array. The beams may be shaped and steered by the beamformer in accordance with a number of pre-configured rendering modes (as explained further below). Similarly, the rendering processor 7 may contain microphone beamformers that are configured to produce the individual drive signals for the microphones 13 in the loudspeaker cabinet 2 so as to steer microphone array beams (i.e., beamformers) to a given direction. The microphone arrays can thus exhibit or provide nulls in other given directions. Accordingly, the beamforming process, also referred to as spatial filtering, may be a signal processing technique using the microphone array for directional sound reception.

A rendering mode selection is made by decision logic 8. The decision logic 8 may be implemented as a programmed processor, e.g., by sharing the rendering processor 7 or by the programming of a different processor, executing a program that based on certain inputs, makes a decision as to which sound rendering mode to use, for a given piece of sound program content that is being or is to be played back, in accordance with which the rendering processor 7 will drive the loudspeaker drivers 3 (during playback of the piece of sound program content to produce the desired beams). More generally, the selected sound rendering mode can be changed during the playback automatically based on, as explained further below, analysis performed by the decision logic 8. The decision logic 8 may include a room acoustics analyzer 81, a listener location detector 82, a content analyzer 83, a speaker location detector 84 and a residual echo analyzer 85.

The decision logic 8 may automatically (that is without requiring immediate input from a user or listener of the audio system) change the rendering mode selection during the playback, based on changes in its decision logic inputs. In one aspect, the decision logic inputs include one or both of sensor data and a user interface selection. The sensor data may include measurements taken by, for example a proximity sensor, an imaging camera such as a depth camera, or a directional sound pickup system, for example one that uses a microphone array. The sensor data and optionally the user interface selection (which may, for example, enable a listener to manually delineate the bounds of the room as well as the size and the location of furniture or other objects therein) may be used by a process of the listener location detector 82, to compute a listener location, for example a radial position given by an angle relative to a front or forward axis of the loudspeaker cabinet 2.

The user interface selection may indicate features of the room, for example the distance from the loudspeaker cabinet 2 to an adjacent wall, a ceiling, a window, or an object in the room such as a furniture piece. In one aspect, the speaker location detector 84 may determine the location of the loudspeaker cabinet 2 in the room by using the features of the room as inputted by the user via user interface selection. In one aspect, the room acoustics analyzer 81 may use the sensor data, for example, to measure a sound reflection value or a sound absorption value for the room or some feature in the room.

More generally, the speaker location detector 84 may have the ability (including the digital signal processing algorithms) to evaluate interactions between the individual loudspeaker drivers 3 and the room, for example, to determine when the loudspeaker cabinet 2 has been placed close to an acoustically reflective surface. In such a case, and as explained below, an ambient beam (of the complex mode or ambient-direct rendering mode) may be oriented at a different angle in order to promote the desired stereo enhancement or immersion effect.

The user interface selection may also include a current playback volume that is to be set on the audio system for playback a piece of sound program content. For example, the rendering processor 7 may be part of a computing device 18, see FIG. 6, which may receive the current playback volume as a volume selection input from the user (e.g., via a mouse or a keyboard used to navigate the user interface on the display screen of the computing device 18). The decision logic 8 may receive this current playback volume and select one of a plurality of sound rendering modes based on the current playback volume, and to change the selected sound rendering mode based on changes the current playback volume, as explained below.

The content analyzer 3 of the decision logic 8 receives the input audio channels of a piece of sound program content as shown in FIG. 1 and determines a dynamic measurement of content energy of the piece of sound program content that is to be converted into sound by the loudspeaker array. For example, the dynamic measurement of the content energy may be determined by calculating the root mean square (RMS) of the piece of sound program content. The RMS of the piece of sound program content may indicate the loudness of the piece of sound program content. When the RMS is lower, the piece of sound program content may be speech (e.g., podcast or audio book) or classical music. When the RMS is higher, the piece of sound program content may be an action movie or punk rock or death metal. As further explained below, the decision logic 8 may change the selected sound rendering mode based on the dynamic measurement of content energy of the piece of sound program content.

Residual echo analyzer 85 included in the decision logic 8 may determine a residual echo in acoustic signals received by at least one of the plurality of microphones in the speaker cabinet 2 by comparing the acoustic signals from the microphones in the loudspeaker cabinet 2 to the sound being played back by the loudspeaker array. In another aspect, the rendering processor 7 includes an echo cancellation system which performs echo cancellation on the acoustic signals received by the microphones 13 based on the sound being played back by the loudspeaker drivers 3. The echo cancellation system may also determine the residual echo in the acoustic signals. In these aspects, as further explained below, the decision logic 8 may change the selected sound rendering mode based on the residual echo.

In one aspect, the speaker location detector 84 in the decision logic 8 may detect a location of a speaker using at least one of a visual sensor or an audio sensor. In this aspect, the speaker location detector 84 may signal to the rendering processor 7 to signal to the plurality of microphones 13 to generate a microphone beamformer in a direction of the location of the speaker to capture the speaker's speech. Accordingly, with the microphone beamformer in the direction of the location of the speaker, the microphones 13 are better able to capture the speaker's speech and accordingly, the audio system in FIG. 1 may accurately process voice recognition and voice triggers (e.g., voice commands to the system).

The rendering processor 7 has several sound rendering modes of operation including a plurality of free space modes (e.g., mid-side modes) and a plurality of complex modes (e.g., ambient-direct modes). The rendering processor 7 is thus pre-configured with such rendering modes or has the ability to perform beamforming in such modes, so that the current rendering mode can be selected and changed by the decision logic 8 in real time, during playback of the piece of sound program content. These modes are viewed as distinct stereo enhancements to the input audio channels (e.g., L and R) from which the system can choose, based on whichever is expected to have the best or highest impact on the listener in the particular room, and for the particular content that is being played back. An improved stereo effect or immersion in the room may thus be achieved. It may be expected that each of the different modes may have a distinct advantage (in terms of providing a more immersive stereo effect to the listener) not just based on the listener location and room acoustics, but also based on content analysis of the particular sound program content.

FIG. 2 is an elevation view of sound beams produced in a one of the plurality of free-space mode in one aspect of the disclosure. In each of the free space modes of the rendering processor 7, the outputs of the rendering processor 7 may cause the loudspeaker drivers 3 to produce sound beams having (i) an omnidirectional pattern that includes a sum of two or more of the input audio channels, superimposed with (ii) a directional pattern that has a number of lobes where each lobe contains a difference of the two or more input channels. As an example, FIG. 2 depicts sound beams produced in a free space mode, for the case of two input audio channels L and R (a stereo input). The loudspeaker cabinet 2 produces an omni beam 10 (having an omnidirectional pattern as shown) superimposed with a dipole beam 11. The omni beam 10 may be viewed as a monophonic down mix of a stereophonic (L, R) original. The dipole beam 11 is an example of a more directional pattern, having in this case two primary lobes where each lobe contains a difference of the two input channels L, R but with opposite polarities. In other words, the content being output in the lobe pointing to the right in the figure is L–R, while the content being output in the lobe pointing to the left of the dipole is –(L–R)=R–L. To produce such a combination of beams, the rendering processor 7 may have a beamformer that can produce a suitable, linear combination of a number pre-defined orthogonal modes, to produce the superposition of the omni beam 10 and the dipole beam 11. This beam combination results in the content being distributed within sectors of a general circle.

The resulting or combination sound beam pattern is referred to here as having a "stereo density" that is determined by the number of adjoining stereo sectors that span the 360 degrees shown (in the horizontal plane and around the center vertical axis 9 of the loudspeaker cabinet 2). Each stereo sector is composed of a center region C flanked by a left region L and a right region R. Thus, in the case of the free space mode, the stereo density there is defined by only two adjoining stereo sectors, each having a separate and diametrically opposite center region C and each sharing a single left region L and a single right region R which are also diametrically opposed to each other. Each of these stereo sectors, or the content in each of these stereo sectors, is a result of the superposition of the omni beam 10 and the dipole beam 11 as seen in FIG. 2. For example, the left region L is obtained as a sum of the L–R content in the right-pointing lobe of the dipole beam 11 and the L+R content of the omni beam 10, where here the quantity L+R is also named C.

Another way to view the dipole beam 11 depicted in FIG. 2 is as an example of a lower order free space rendering mode in which there are only two primary or main lobes in the directional pattern and each lobe contains a difference of the same two or more input channels, with the understanding that adjacent ones of these main lobes are of opposite polarity to each other. It is understood that some of the free space rendering modes may implement higher order beam patterns (e.g., quadrupole beams). The high order free space mode has a beam pattern that has a greater directivity index or it may be viewed as having a greater number of primary lobes than the low order free space mode. Viewed another way, the various free space modes available in the rendering processor 7 produce sound beams patterns, respectively, of increasing order.

It should be noted that certain types of diffuse content benefit from being played back through a lower-order free space mode, which accentuates the spatial separation of uncorrelated content (in the room.) Other types of content that already contain a strong spatial separation, such as hard-panned discrete sources, may benefit from a higher-order free space mode, that produces a more uniform stereo experience around the loudspeaker. In the extreme case, a lowest order free space mode may be one in which there is essentially only the omni beam 10 being produced, without any directional beam such as the dipole beam 11, which may be appropriate when the sound content is purely monophonic. An example of that case is when computing the difference between the two input channels, R–L (or L–R) results in essentially zero or very little signal components.

Figure 3:
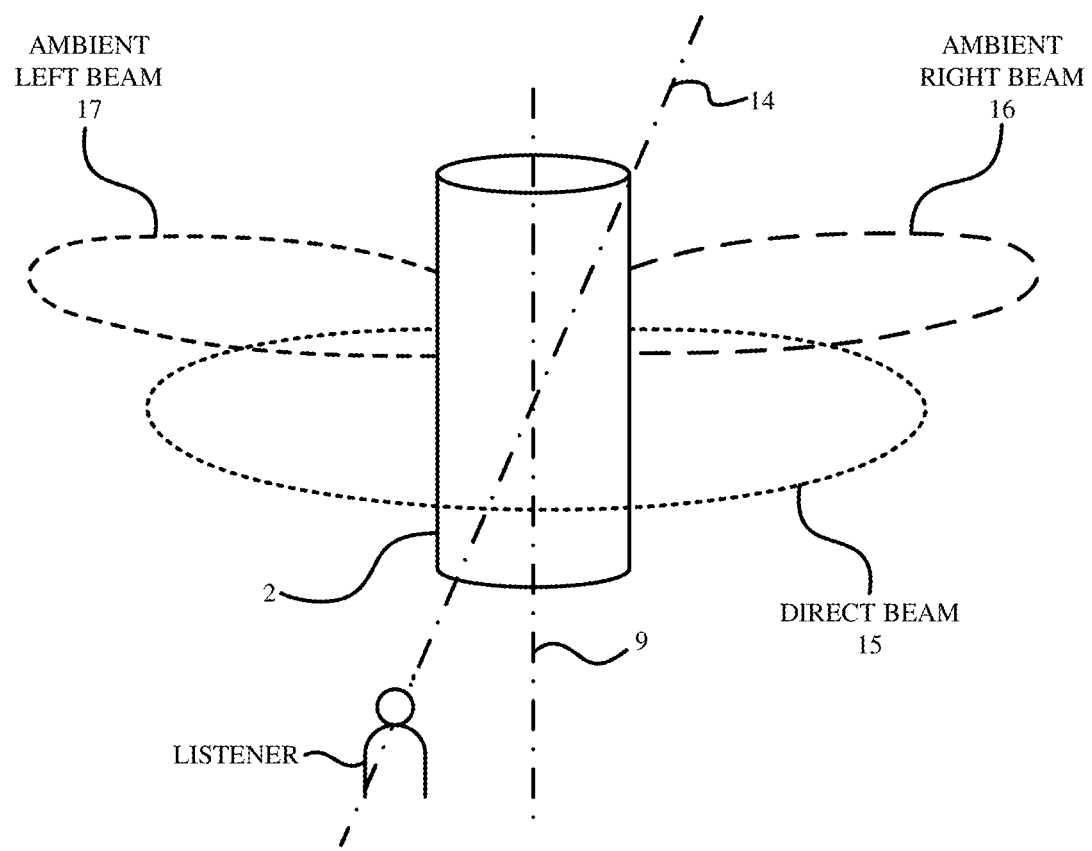
FIG. 3 depicts an elevation view of an example of the sound beam patterns produced in one of a plurality of complex mode in one aspect of the disclosure.

FIG. 3 depicts an elevation view of an example of the sound beam patterns produced in one of a plurality of complex mode in one aspect of the disclosure. Here, the outputs of a beamformer in the rendering processor 7 (see FIG. 1) cause the loudspeaker drivers 3 of the array to produce sound beams having (i) a direct content pattern (direct beam 15), superimposed with (ii) an ambient content pattern that is more directional than the direct content pattern (here, ambient right beam 16 and ambient left beam 17). The direct beam 15 may be aimed at a previously determined listener axis 14, while the ambient beams 16, 17 are aimed away from the listener axis 14. The listener axis 14 represents the current location of the listener, or the current listening position (relative to the loudspeaker cabinet 2.) The location of the listener may have been computed by the decision logic 8, for example as an angle relative to a front axis (not shown) of the loudspeaker cabinet 2, using any suitable combination of its inputs including sensor data and user interface selections. Note that the direct beam 15 may not be omnidirectional, but is directional (as are each of the ambient beams 16, 17.) Also, certain parameters of the complex mode may be variable (e.g., beam width and angle) dependent on audio content, room acoustics, and loudspeaker cabinet 2 placement.

The decision logic 8 analyzes the input audio channels, for example using time-windowed correlation, to find correlated content and uncorrelated (or de-correlated) content therein. For example, the L and R input audio channels may be analyzed, to determine how correlated any intervals or segments in the two channels (audio signals) are relative to each other. Such analysis may reveal that a particular audio segment that effectively appears in both of the input audio channels is a genuine, "dry" center image, with a dry left channel and a dry right channel that are in phase with each other; in contrast, another segment may be detected that is considered to be more "ambient" where, in terms of the correlation analysis, an ambient segment is less transient than a dry center image and also appears in the difference computation L−R (or R−L). As a result, the ambient segment should be rendered as diffuse sound by the audio system, by reproducing such a segment only within the directional pattern of the ambient right beam 16 and the ambient left beam 17, where those ambient beams 16, 17 are aimed away from the listener so that the audio content therein (referred to as ambient or diffuse content) can bounce off of the walls of the room (see also FIG. 1). In other words, the correlated content is rendered in the direct beam 15 (having a direct content pattern), while the uncorrelated content is rendered in the, for example, ambient right beam 16 and ambient left beam 17 (which have ambient content patterns.)

Another example of ambient content is a recorded reverberation of a voice. In that case, the decision logic 8 detects a direct voice segment in the input audio channels, and then signals the rendering processor 7 to render that segment in the direct beam 15. The decision logic 8 may also detect a reverberation of that direct voice segment, and a segment containing that reverberation is also extracted from the input audio channels and, in one aspect, is then rendered only through the side-firing (more directional and aimed away from the listener axis 14) ambient right beam 16 and ambient left beam 17. In this manner, the reverberation of the direct voice will reach the listener via an indirect path thereby providing a more immersive experience for the listener. In other words, the direct beam 15 in that case should not contain the extracted reverberation but should only contain the direct voice segment, while the reverberation is relegated to only the more directional and side-firing ambient right beam 16 and ambient left beam 17.

While the rendering modes may optimize the user's listening experience, the voice recognition accuracy may suffer at high listening levels (e.g. high volume set on the audio system, high loudness metric associated with the content being played back). For example, voice trigger accuracy is very high when the audio system providing no audio playback. However, as the audio playback (e.g., music) from the internal loudspeaker drivers 3 begins to dominate the user's voice commands to be received by the internal microphones 13 of the audio system, the voice trigger accuracy decreases (see FIG. 1).

Further, the voice recognition accuracy may also vary based on the selected rendering modes of the audio system. Referring back to FIG. 1, the voice trigger accuracy may depend on how the internal loudspeaker drivers 3 in the audio system are energized. For example, different sound rendering modes (e.g., playback patterns such as omnidirectional, cardiod, complex, etc.) lead to different levels of echo on the internal microphones 13 which increases or decreases the speech to echo ratios at the microphones 13 and thus, affecting the voice trigger accuracy.

An aspect of the disclosure aims to manage the tradeoffs between rendering audio with clarity and immersion or a sense of space (e.g., a broad and spacious playback), within a room or other confined space, using a loudspeaker array, and maintaining high voice recognition accuracy.

Figure 4:
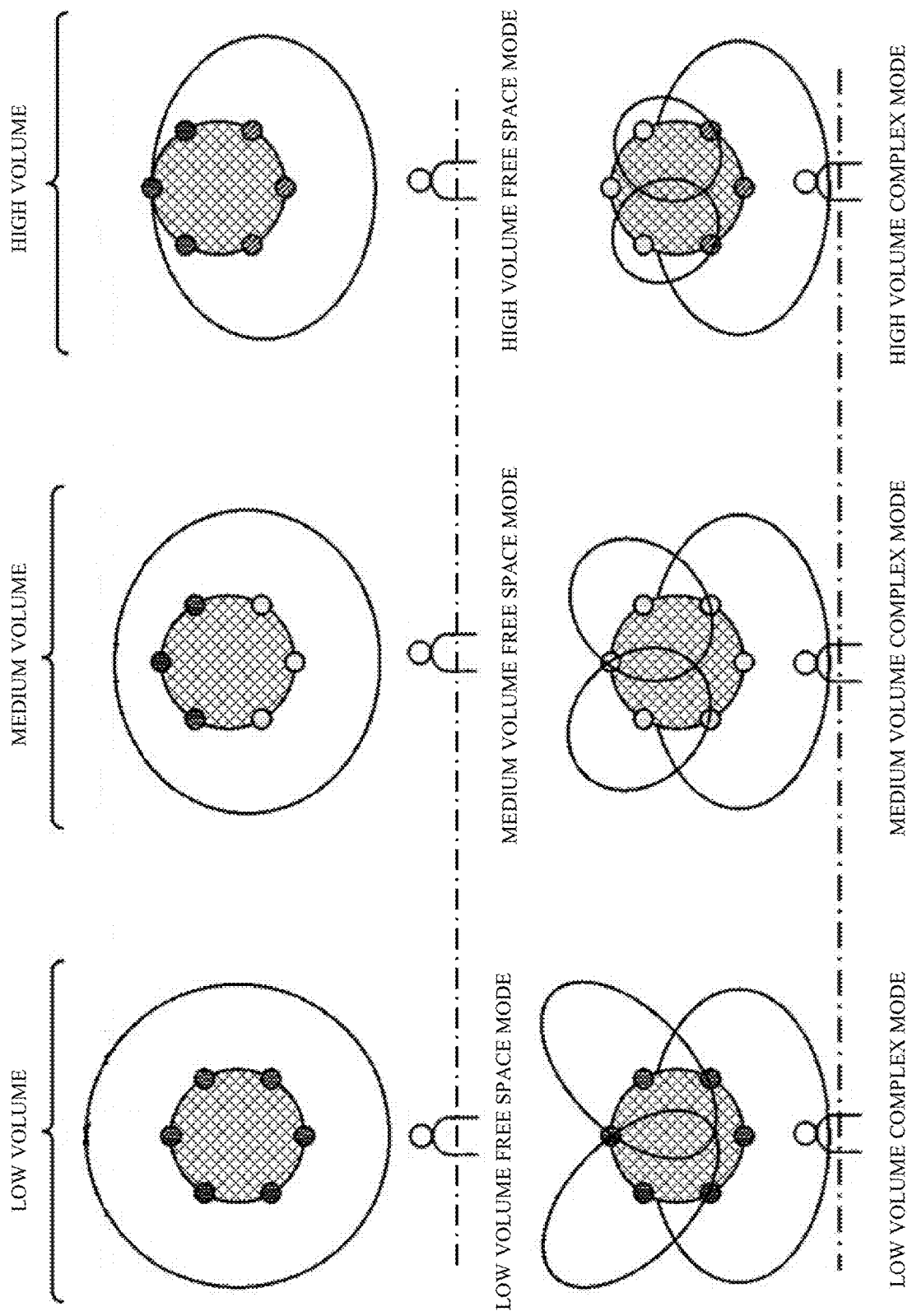
FIG. 4 is an elevation view of a plurality of free-space modes and a plurality of complex modes in one aspect of the disclosure.

FIG. 4 is an elevation view of a plurality of free-space modes and a plurality of complex modes in one aspect of the disclosure. In the top row of FIG. 4, three free space modes are illustrated and in the bottom row of FIG. 4, three complex modes are illustrated. As shown in FIG. 4, aspects of the disclosure aim to select and change the sound rendering modes based on the different sound listening levels (e.g., low volume, medium volume, high volume). Additionally, FIG. 4 shows the relationship between the sound rendering modes and a listener position, wherein the listener position is static across each rendering mode.

In one aspect, the decision logic 8 may select one of the sound rendering modes based on the current playback volume. The decision logic 8 may compare the current playback volume to a first volume threshold and a second volume threshold to determine whether the current playback volume is low, medium or high. In this aspect, the first volume threshold is lower than the second volume threshold. The decision logic 8 may select the low volume free space mode or the low volume complex mode (see left column in FIG. 4) when the current playback volume is lower than the first volume threshold. The decision logic 8 may select the medium volume free space mode or the medium volume complex mode (see middle column in FIG. 4) when the current playback volume is higher than the first volume threshold and lower than the second volume threshold. The decision logic 8 may select the high volume free space mode or the high volume complex mode (see right column in FIG. 4) when the current playback volume is higher than the second volume threshold.

As discussed above, to determine whether a free space mode or a complex mode should be selected, the decision logic 8 may determine whether the audio system is located within a predetermined distance from an acoustically reflective surface. In this manner, the audio system is best able to maximize the listening experience based on the location of the loudspeaker cabinet 2 in a room. In this aspect, when the audio system is not located within the predetermined distance from an acoustically reflective surface, the decision logic 8 selects one of the free space modes and when the audio system is located within a predetermined distance from an acoustically reflective surface, the decision logic 8 selects one of the complex modes.

Referring back to FIG. 4, the free space modes includes at least a low volume free space mode, a medium volume free space mode, and a high volume free space mode. In the low volume free space mode, the loudspeaker array produces audio that is played consistently around the audio system whereas, in the high volume free space mode, the loudspeaker array produces a focused sound beam that is aimed at the listening position. To produce the focused sound beam, the loudspeaker drivers 3 positioned away from the listening position (e.g., top of FIG. 4) emit lower energy than the loudspeaker drivers 3 positioned towards the listening position (e.g., bottom of FIG. 4). In the medium volume free space mode, the loudspeaker array produces the focused sound beam aimed at the listening position similar to the high volume free space mode. However, as shown in FIG. 4, the loudspeaker drivers 3 in the loudspeaker array positioned away from the listening position in the medium volume free space mode emit higher energy than the loudspeaker drivers positioned away from the listening position in the high volume free space mode. In another aspect, to produce the focused sound beam, the loudspeaker drivers 3 positioned closest to a power cord on the loudspeaker cabinet 2 (e.g., towards the top of FIG. 4) emit lower energy than the loudspeaker drivers 3 positioned away from the power cord (e.g., towards the bottom of FIG. 4). For each of the free space modes in FIG. 4, the power cord may be located by the three drivers 3 at the top of FIG. 4.

In FIG. 4, the plurality of complex modes includes at least a low volume complex mode, a medium volume complex mode, and a high volume complex mode. In one aspect, at least one sound beam having the ambient content pattern (e.g., beam(s) directed away from the listener or directed towards the power cord) in the low volume complex mode emits higher energy than the at least one sound beam having the ambient content pattern in the high volume complex mode. For each of the complex modes in FIG. 4, the power cord may be located by the three drivers 3 closer to the top of FIG. 4. As shown in FIG. 4, in the medium volume complex mode, the at least one sound beam having the ambient content pattern emits lower energy than the at least one sound beam having the ambient content pattern in the low volume complex mode, and emits higher energy than the at least one sound beam having the ambient content pattern in the high volume complex mode.

In one aspect, the current playback volume obtained by the decision logic 8 as a user inputted playback volume set on the audio system. For example, the user may input a setting in a user interface that establishes the playback volume set on the audio system. In another aspect, the decision logic 8 determines a dynamic measurement of content energy of the piece of sound program content that is to be converted into sound by the loudspeaker array and changes the selected sound rendering mode based on the dynamic measurement of content energy of the piece of sound program content. As discussed above, the dynamic measurement of the content energy may be determined by calculating the root mean square (RMS) of the piece of sound program content. The RMS of the piece of sound program content may indicate the loudness of the piece of sound program content. For example, when the current playback volume is set to 8/10 and determined to be a high volume level such that the decision logic 8 selected a high volume free space mode or a high volume complex mode, the decision logic 8 may then determine that the dynamic measurement of content energy is low because the piece of sound program content is mostly speech (e.g., a podcast). In this scenario, the decision logic 8 may change the rendering mode from a high volume free space mode or a high volume complex mode to a medium volume free space mode or a medium volume complex mode because the loudness of the piece of sound program content does not warrant diminishing the listening experience to ensure that the audio system maintain its responsiveness to voice commands.

Similarly, when the current playback volume is set to 2/10 and determined to be a low volume level such that the decision logic 8 selected a low volume free space mode or a low volume complex mode, the decision logic 8 may then determine that the dynamic measurement of content energy is high because the piece of sound program content is mostly loud music (e.g., a death metal). In this scenario, the decision logic 8 may change the rendering mode from a low volume free space mode or a low volume complex mode to a medium volume free space mode or a medium volume complex mode because the loudness of the piece of sound program content requires diminishing the listening experience to ensure that the audio system maintain its responsiveness to voice commands.

In some aspects, the decision logic 8 may determine the dynamic measurement of content energy by determining a root mean square (RMS) of the piece of sound program content that is to be converted into sound by the loudspeaker array. In this aspect, the decision logic 8 may change the selected sound rendering mode based on the root mean square (RMS) of the piece of sound program content.

In another aspect, the residual echo in the acoustic signals received by the microphones 13 may provide indication on how well the audio system is performing. In one aspect, the decision logic 8 may determine a residual echo in acoustic signals received by at least one of the plurality of microphones based on the sound being played back by the loudspeaker array, and change the selected sound rendering mode based on the residual echo. For example, if the decision logic 8 determines that the residual echo is higher than a predetermined threshold, the decision logic 8 may change the selected sound rendering mode to diminishing the listening experience to ensure that the audio system maintain its responsiveness to voice commands. In this scenario, the decision logic 8 may change the selected sound rendering mode from a medium volume free space mode or a medium volume complex mode to a high volume free space mode or a high volume complex mode.

In one aspect, the decision by the decision logic 8 to increase or decrease the energy levels of the at least one sound beam having the ambient content pattern when in complex mode may be relative to the perception or sensitivity of the microphones 13 rather than relative to the energy levels emitted by the loudspeaker drivers 3 of the ambient content pattern. For example, a first driver of an array may be emitting energy that is perceived as lower by the microphones 13 as compared to the energy that is emitted by a second driver of an array as perceived by the microphones 13, and thus causing greater echo coupling energy on the microphones 13, even though the first driver is actually emitting more than or equal energy to the energy emitted by the second driver. In this scenario, when the decision logic 8 changes the rendering mode from a high volume complex mode to a medium volume complex mode, the energy emitted by the first driver of an array may maintain or increase while the energy emitted by the second driver of the array may be decreased, reducing the echo coupling energy on the microphones 13 and potentially maintaining or increasing the overall energy of the total pattern. Similarly, when the decision logic 8 changes the rendering mode from a medium volume complex mode to a low volume complex mode, the energy emitted by the first driver of an array may maintain or increase while the energy emitted by the second driver of the array may be decreased, reducing the echo coupling energy on the microphones 13 and potentially maintaining or increasing the overall energy of the total pattern.

Moreover, the following aspects of the disclosure may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5:
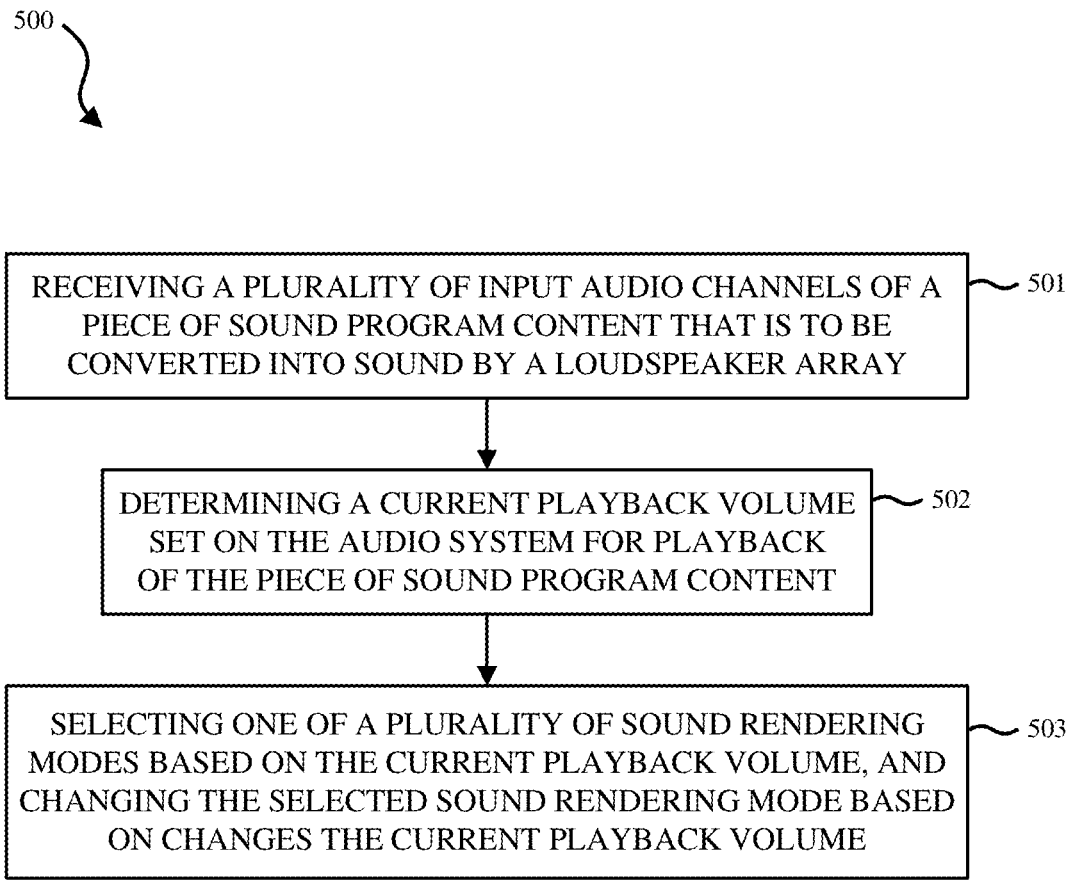
FIG. 5 is a flowchart of a method for maintaining the accuracy of voice recognition in an audio system in accordance with one aspect of the disclosure.

FIG. 5 is a flowchart of a method 500 for maintaining the accuracy of voice recognition in an audio system in accordance with one aspect of the disclosure. The method 500 starts by receiving a plurality of input audio channels of a piece of sound program content that is to be converted into sound by a loudspeaker array (Block 501). At Block 502, the current playback volume set on the audio system for playback of the piece of sound program content is then determined. At Block 503, one of a plurality of sound rendering modes based on the current playback volume is selected and may be changed based on at least the changes to the current playback volume. In one aspect, the plurality of sound rendering modes include at least one of: a) a plurality of free space modes or b) a plurality of complex modes (See FIG. 4).

As described above, one aspect of the present technology is the gathering and use of data available from various sources to improve the accuracy of voice recognition. The present disclosure contemplates that in some instances, this gathered data may include personal information data that uniquely identifies or can be used to contact or locate a specific person. Such personal information data can include demographic data, location-based data, telephone numbers, email addresses, TWITTER ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used balance audio playback while maintaining the ability to recognize voice commands. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of voice recognition of commands, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, vocal triggers and commands can be recognized based on non-personal information data or a bare minimum amount of personal information, such as the content being requested by the device associated with a user, other non-personal information available to the computing device, or publicly available information.

To summarize, aspects of the disclosure are aim to balance the dual goals of (i) enhancing a listening experience achieved by re-packaging an original audio recording, in view of room acoustics, listener location, and the direct versus ambient nature of content within the original recording, and (ii) ensuring that the audio system maintains responsiveness to voice trigger commands. A processor that is executing instructions stored within a machine-readable medium may implement the capabilities of the decision logic 8, in terms of content analysis, listener location or listening position determination, speaker location determination, residual echo analysis, and room acoustics determination, and the capabilities of the beamformer in the rendering processor 7. The machine-readable medium (e.g., any form of solid state digital memory) together with the processor may be housed within a separately housed computing device 18 (see the room depicted in FIG. 6), or they may be contained within the loudspeaker cabinet 2 of the audio system (see also FIG. 1). The so-programmed processor receives the input audio channels of a piece of sound program content, for example via streaming of a music or movie file over the Internet from a remote server. It also receives one or both of sensor data and a user interface selection, that indicates or is indicative of (e.g., represents or is defined by) either room acoustics or a location of a listener. It also performs content analysis upon the piece of sound program content, speaker location detecting and residual echo analysis.

The above-described techniques may be particularly effective in the case where the audio system relies primarily on a single loudspeaker cabinet (having the loudspeaker array housed within), where in that case all content above a cut-off frequency, such as less than or equal to 500 Hz (e.g., 300 Hz), in all of the input audio channels of the piece of sound program content, are to be converted into sound only by the loudspeaker cabinet. This provides an elegant solution to the problem of how to obtain immersive playback using a very limited number of loudspeaker cabinets, for example just one, which may be particularly desirable for use in a small room (in contrast to a public movie theater or other larger sound venue.)

Figure 6:
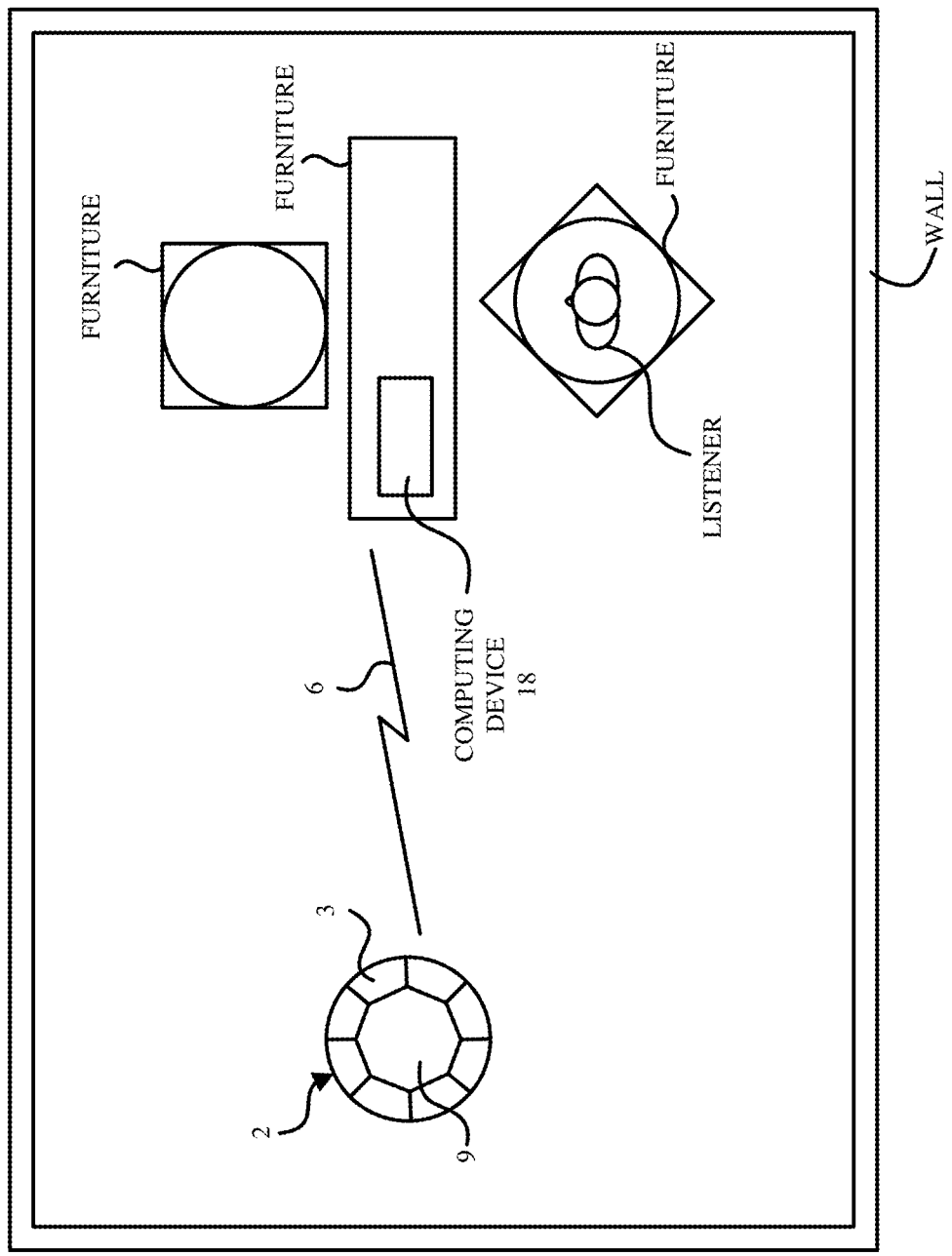
FIG. 6 is a downward view onto a horizontal plane of a room in which the audio system is operating in one aspect of the disclosure.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. For example, FIG. 6 depicts the audio system as a combination of the computing device 18 and the loudspeaker cabinet 2 in the same room, with several pieces of furniture and a listener. Although in this case there is just a single instance of the loudspeaker cabinet 2 communicating with the computing device 18, in other cases there may be additional loudspeaker cabinets that are communicating with the computing device 18 during the playback (e.g., a woofer and a sub-woofer that are receiving the audio content that is below the lower cut-off frequency of the loudspeaker array.) The description is thus to be regarded as illustrative instead of limiting.

In some instances, the audio system has decision logic to select one of a plurality of sound rendering modes based on the current playback volume, by comparing the current playback volume to a first volume threshold and a second volume threshold, wherein the first volume threshold is lower than the second volume threshold, and wherein selecting the first volume complex mode when the current playback volume is lower than the first volume threshold, selecting the third volume complex mode when the current playback volume is higher than the first volume threshold and lower than the second volume threshold, and selecting the second volume complex mode when the current playback volume is higher than the second volume threshold.

In another instance, the decision logic further determines a dynamic measurement of content energy of the piece of sound program content that is to be converted into sound by the loudspeaker array, and changes the selected sound rendering mode based on the dynamic measurement of content energy of the piece of sound program content.

In yet another instance, the decision logic further determines a residual echo in acoustic signals received by at least one of the plurality of microphones based on the sound being played back by the loudspeaker array; and changes the selected sound rendering mode based on the residual echo.

In yet another instance, the decision logic detects a location of a speaker using at least one of a visual sensor or an audio sensor; and generates a microphone beam (from a plurality of microphone signals) in a direction of the location of the speaker to capture the speaker's speech.

In one instance, in the plurality of sound rendering modes of operation there can be a plurality of free space modes, wherein the plurality of free space modes includes at least a first volume free space mode and a second volume free space mode, wherein, in the first volume free space mode, the loudspeaker array produces audio that is played consistently around the audio system, and wherein, in the second volume free space mode, the loudspeaker array produces a focused sound beam that is aimed at the listening position, wherein to produce the focused sound beam, the loudspeaker drivers positioned away from the listening position emit lower energy than the loudspeaker drivers positioned towards the listening position.

In some cases, the plurality of free space modes include a third volume free space mode, wherein, in the third volume free space mode, the loudspeaker array produces the focused sound beam aimed at the listening position, wherein the loudspeaker drivers in the loudspeaker array positioned away from the listening position in the third volume free space mode emit higher energy than the loudspeaker drivers positioned away from the listening position in the second volume free space mode. In another instance, the decision logic selects the one of the plurality of sound rendering modes further based on whether the audio system is located within a predetermined distance from an acoustically reflective surface, wherein when the audio system is not located within the predetermined distance from an acoustically reflective surface, one of the plurality of free space modes is selected, and when the audio system is located within a predetermined distance from an acoustically reflective surface, one of the plurality of complex modes is selected.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method for maintaining accuracy of voice recognition in an audio system comprising:

receiving a plurality of input audio channels of a piece of sound program content that is to be converted into sound by a loudspeaker array housed in a loudspeaker cabinet, wherein the audio system includes the loudspeaker array, wherein the loudspeaker array includes a plurality of loudspeaker drivers;

determining a current playback volume set on the audio system for playback of the piece of sound program content; and selecting one of a plurality of sound rendering modes based on the current playback volume, and changing the selected sound rendering mode based on changes in the current playback volume, wherein the plurality of sound rendering modes include a plurality of free space modes, wherein the plurality of free space modes includes at least a first volume free space mode, a second volume free space mode, and a third volume free space mode, wherein, in the first volume free space mode, the loudspeaker array produces audio that is played consistently around the audio system, wherein, in the second volume free space mode, the loudspeaker array produces a focused sound beam that is aimed at a listening position, wherein to produce the focused sound beam, the loudspeaker drivers in the loudspeaker array that are positioned away from the listening position emit lower energy than the loudspeaker drivers positioned towards the listening position, and wherein in the third volume free space mode, the loudspeaker array produces a focused sound beam aimed at the listening position while the loudspeaker drivers that are positioned away from the listening position emit higher energy than they do in the second volume free space mode.

2. The method of claim 1, wherein in each of the plurality of free space modes, the loudspeaker array produces sound beams having i) an omni-directional pattern that includes a sum of two or more of the plurality of input audio channels, superimposed with ii) a directional pattern that has a plurality of lobes each lobe containing a difference of the two or more input audio channels.

3. The method of claim 1, wherein selecting one of a plurality of sound rendering modes based on the current playback volume includes: comparing the current playback volume to a first volume threshold and a second volume threshold; wherein the first volume threshold is lower than the second volume threshold, wherein selecting the first volume free space mode when the current playback volume is lower than the first volume threshold, selecting the third volume free space mode when the current playback volume is higher than the first volume threshold and lower than the second volume threshold, and selecting the second volume free space mode when the current playback volume is higher than the second volume threshold.

4. The method of claim 1, further comprising:
determining a dynamic measurement of content energy of the piece of sound program content that is to be converted into sound by the loudspeaker array, and
changing the selected sound rendering mode based on the dynamic measurement of content energy of the piece of sound program content.

5. The method of claim 1, further comprising:
determining a residual echo in acoustic signals received by at least one of a plurality of microphones included in the audio system based on the sound being played back by the loudspeaker array; and
changing the selected sound rendering mode based on the residual echo.

6. The method of claim 1, further comprising:
detecting a location of a speaker using at least one of a visual sensor or an audio sensor; and generating a microphone beamformer in a direction of the location of the speaker to capture the speaker's speech.

7. A method for maintaining accuracy of voice recognition in an audio system comprising:

receiving a plurality of input audio channels of a piece of sound program content that is to be converted into sound by a loudspeaker array housed in a loudspeaker cabinet, wherein the audio system includes the loudspeaker array, wherein the loudspeaker array includes a plurality of loudspeaker drivers;

determining a current playback volume set on the audio system for playback the piece of sound program content; and selecting one of a plurality of sound rendering modes based on the current playback volume, and changing the selected sound rendering mode based on changes the current playback volume, wherein the plurality of sound rendering modes include a plurality of complex modes, wherein, in the plurality of complex modes, the loudspeaker array produces i) a sound beam having a direct content pattern that is aimed at a listening position, superimposed with ii) at least one sound beam having an ambient content pattern that is aimed away from the listening position, wherein the plurality of complex modes includes at least a first volume complex mode, a second volume complex mode, and a third volume complex mode, wherein the at least one sound beam having the ambient content pattern in the first volume complex mode emits higher energy than the at least one sound beam having the ambient content pattern in the second volume complex mode, and in the third volume complex mode, the at least one sound beam having the ambient content pattern (i) emits lower energy than does the at least one sound beam having the ambient content pattern in the first volume complex mode, and (ii) emits higher energy than does the least one sound beam having the ambient content pattern in the second volume complex mode.

8. The method of claim 7, wherein the energy is echo coupling energy on at least one microphone in the same housing as the loudspeaker array.

9. The method of claim 7, wherein selecting one of a plurality of sound rendering modes based on the current playback volume includes:

comparing the current playback volume to a first volume threshold and a second volume threshold, wherein the first volume threshold is lower than the second volume threshold, wherein
selecting the first volume complex mode when the current playback volume is lower than the first volume threshold,
selecting the third volume complex mode when the current playback volume is higher than the first volume threshold and lower than the second volume threshold, and
selecting the second volume complex mode when the current playback volume is higher than the second volume threshold.

10. The method of claim 7, further comprising:
determining a dynamic measurement of content energy of the piece of sound program content that is to be converted into sound by the loudspeaker array, and
changing the selected sound rendering mode based on the dynamic measurement of content energy of the piece of sound program content.

11. The method of claim 7, further comprising:
determining a residual echo in acoustic signals received by at least one of a plurality of microphones included in the audio system based on the sound being played back by the loudspeaker array; and
changing the selected sound rendering mode based on the residual echo.

12. The method of claim 7, further comprising:
detecting a location of a speaker using at least one of a visual sensor or an audio sensor; and
generating a microphone beamformer in a direction of the location of the speaker to capture the speaker's speech.

13. The method of claim 7, wherein the plurality of sound rendering modes of operation further include a plurality of free space modes,
wherein the plurality of free space modes includes at least a first volume free space mode and a second volume free space mode,
wherein, in the first volume free space mode, the loudspeaker array produces audio that is played consistently around the audio system, and
wherein, in the second volume free space mode, the loudspeaker array produces a focused sound beam that is aimed at the listening position, wherein to produce the focused sound beam, the loudspeaker drivers positioned away from the listening position emit lower energy than the loudspeaker drivers positioned towards the listening position.

14. The method claim 13, wherein the plurality of free space modes include a third volume free space mode, wherein, in the third volume free space mode, the loudspeaker array produces the focused sound beam aimed at the listening position, wherein the loudspeaker drivers in the loudspeaker array positioned away from the listening position in the third volume free space mode emit higher energy than the loudspeaker drivers positioned away from the listening position in the second volume free space mode.

15. The method of claim 13, wherein a decision to select the one of the plurality of sound rendering modes is further based on whether the audio system is located within a predetermined distance from an acoustically reflective surface, wherein
when the audio system is not located within the predetermined distance from an acoustically reflective surface, one of the plurality of free space modes is selected, and
when the audio system is located within a predetermined distance from an acoustically reflective surface, one of the plurality of complex modes is selected.

16. An audio system for maintaining accuracy of voice recognition comprising:
a plurality of microphones to receive acoustic signals, wherein the acoustic signals include a speaker's speech;
a loudspeaker cabinet, having integrated therein a loudspeaker array that includes a plurality of loudspeaker drivers and a plurality of audio amplifiers;
a rendering processor to receive a plurality of input audio channels of a piece of sound program content that is to be converted into sound by the loudspeaker array, the rendering processor having outputs that are coupled to inputs of the plurality of audio amplifiers, the rendering processor having a plurality of sound rendering modes of operation that include a plurality of complex modes,
wherein, in the plurality of complex modes, the loudspeaker array produces i) a sound beam having a direct content pattern that is aimed at a listening position, superimposed with at least one sound beam having an ambient content pattern that is aimed away from the listening position; and
a decision logic
to determine a current playback volume set on the audio system for playback the piece of sound program content, and
to select one of a plurality of sound rendering modes based on the current playback volume, and to change the selected sound rendering mode based on changes the current playback volume,
wherein the plurality of complex modes includes at least a first volume complex modes, a second volume complex mode, and a third volume complex mode,
wherein the at least one sound beam having the ambient content pattern in the first volume complex mode emits higher energy than the at least one sound beam having the ambient content pattern in the second volume complex mode, and
in the third volume complex mode, the at least one sound beam having the ambient content pattern emits lower energy than does the at least one sound beam having the ambient content pattern in the first volume complex mode, and emits higher energy than does the at least one sound beam having the ambient content pattern in the second volume complex mode.

17. The audio system of claim 16, wherein the energy is echo coupling energy on at least one microphone in the same housing as the loudspeaker array.

* * * * *